(12) United States Patent
Chen et al.

(10) Patent No.: US 7,889,230 B2
(45) Date of Patent: Feb. 15, 2011

(54) VEHICLE REAR SIDE VIDEO MONITORING SYSTEM

(75) Inventors: Kuo-Rong Chen, Panchiao (TW); Chun-Chung Lee, Taipei (TW); Cheng-Hung Huang, Miaoli Hsien (TW)

(73) Assignee: Sin Etke Technology Co., Ltd., Taipei (TW)

(*) Notice: Subject to any disclaimer, the term of this patent is extended or adjusted under 35 U.S.C. 154(b) by 1429 days.

(21) Appl. No.: 11/334,375

(22) Filed: Jan. 19, 2006

(65) Prior Publication Data

US 2006/0176370 A1    Aug. 10, 2006

(30) Foreign Application Priority Data

Feb. 4, 2005    (TW) .............................. 94103802 A

(51) Int. Cl.
*H04N 7/18*    (2006.01)
*H04N 9/47*    (2006.01)

(52) U.S. Cl. ..................... 348/148; 348/222.1; 348/370

(58) Field of Classification Search ......... 348/117–120, 348/148
See application file for complete search history.

(56) References Cited

U.S. PATENT DOCUMENTS

| | | | |
|---|---|---|---|
| 6,509,832 B1* | 1/2003 | Bauer et al. ................. | 348/148 |
| 2002/0124260 A1* | 9/2002 | Rivera ........................ | 348/148 |
| 2004/0179099 A1* | 9/2004 | Bos et al. .................... | 348/148 |
| 2005/0200700 A1* | 9/2005 | Schofield et al. ............ | 348/148 |
| 2006/0061655 A1* | 3/2006 | Wang ......................... | 348/148 |
| 2006/0125919 A1* | 6/2006 | Camilleri et al. ............ | 348/148 |
| 2006/0145826 A1* | 7/2006 | McMahon et al. .......... | 348/148 |
| 2006/0256459 A1* | 11/2006 | Izabel et al. ................ | 359/872 |
| 2009/0147083 A1* | 6/2009 | Pawlicki et al. ............. | 348/119 |

* cited by examiner

*Primary Examiner*—Gevell Selby
(74) *Attorney, Agent, or Firm*—Bacon & Thomas, PLLC

(57) ABSTRACT

Disclosed is an inexpensive, easy-to-install, highly durable vehicle rear side video monitoring system, which uses a CMOS image pickup device to pick up the image of the scene behind the vehicle, and a high brightness LED to provide sufficient illumination for enabling the CMOS image pickup device to pick up the image clearly.

10 Claims, 4 Drawing Sheets

VEHICLE REAR SIDE VIDEO MONITORING SYSTEM

BACKGROUND OF THE INVENTION

1. Field of the Invention

The present invention relates to a vehicle rear side video monitoring system and more particularly, to such a vehicle rear side video monitoring system, which uses a CMOS image pickup device to pick up the image of the scene behind the vehicle under the illumination of a high brightness LED.

2. Description of Related Art

Due to limited parking space and a big number of cars, it is difficult to park a car in a city. Therefore, it is important to move the car backward rapidly and to park the car on the side of a road safely. According to the designs of conventional cars, the driver has a visual dead angle corresponding to the two opposite lateral sides and the rear side of the body of the car. Further, a car may be equipped with a soundproof structure around the driver's seat, and the driver may be unable to hear abnormal noises before occurrence of an accident when driving the car. In this case, a traffic accident may happen.

Further, a car may be equipped with a CCD (Charge-coupled Device) camera for picking up the image of the scene behind the car. However, a CCD camera is quite expensive, not popularly accepted by car owners. Further, a CCD camera has a bulky size and heavy weight, and is not easy to install. When a CCD camera is used and installed in the rear side of a car, it may fail easily upon heavy vibration of the rear side of the car.

Therefore, it is desirable to provide a vehicle rear side video monitoring system that eliminates the aforesaid drawbacks.

SUMMARY OF THE INVENTION

The present invention provides a vehicle rear side video monitoring system installed in a motor vehicle. The vehicle rear side video monitoring system comprises a CMOS (Comprehensive Metal Oxide Semiconductor) image pickup device, at least one high brightness LED, a display unit, and a controller. The CMOS image pickup device is installed in a specific position of a rear side of the motor vehicle and adapted to pick up and process an image of the scene behind the motor vehicle and to output a corresponding video signal. The at least one high brightness LED is installed in an another specific position of the rear side of the motor vehicle near the specific position. The display unit is mounted inside the motor vehicle. The controller is electrically connected to the CMOS image pickup device, the at least one high brightness LED, and the display unit, wherein the controller controls the at least one high brightness LED to give off light when controlling the CMOS image pickup device to pick up and process the image of the scene behind the motor vehicle, and controls the display unit to display the image of the scene behind the motor vehicle.

Because the system uses a CMOS image pickup device with a high brightness LED, the cost of the parts is less expensive. Further, because the CMOS image pickup device and the high brightness LED have a small size and a light weight, they can easily be installed in the rear side of the motor vehicle for a long service without failure.

The at least one high brightness LED each can be a high brightness white light LED or other color of high brightness LED, and can be installed in the license housing at the rear side of the motor vehicle above the license plate or another suitable location.

The CMOS image pickup device is preferably installed in a rear bumper of the motor vehicle. The CMOS image pickup device can also be installed in the rearview mirror or any other suitable location of the motor vehicle where the CMOS image pickup device can pick up the image of the scene behind the motor vehicle clearly.

The display unit can be a LCD, CRT monitor, head-up display, or any of a variety of suitable display devices.

The vehicle rear side video monitoring system further comprises a starting device electrically connected to the controller and controllable to output a starting signal to the controller, the controller fetches the starting signal to accordingly drive the at least one high brightness LED to give off light. The starting device can be a reverse gear transmission device of the motor vehicle, a photo sensor, an electronic clock, a wireless receiver, or any of a variety of other equivalent means capable of driving the controller to start the at least one high brightness LED and the CMOS image pickup device.

DETAILED DESCRIPTION OF THE PREFERRED EMBODIMENT

Figure 1:
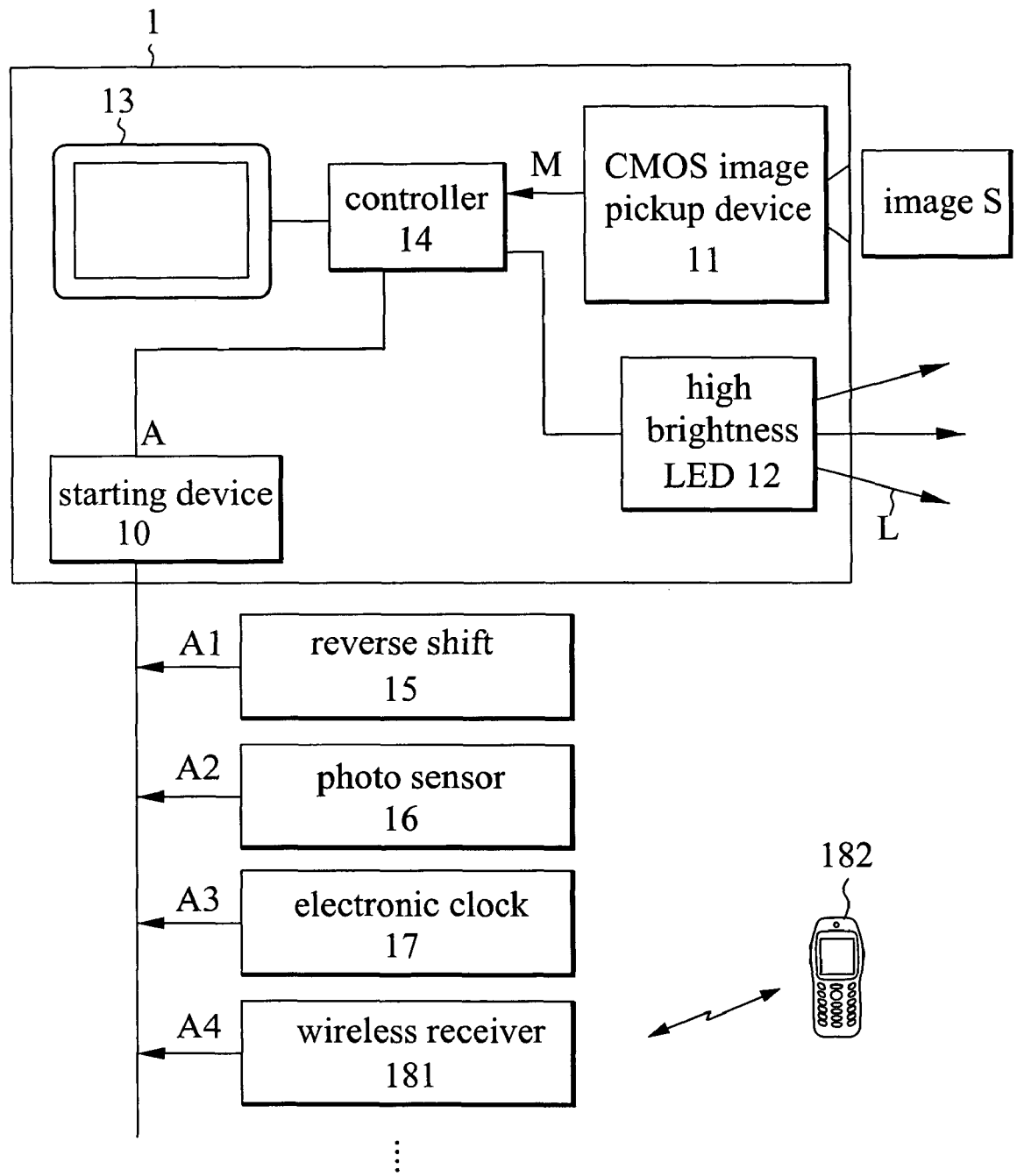
FIG. 1 is a system block diagram of a vehicle rear side video monitoring system according to the present invention.
Figure 2:
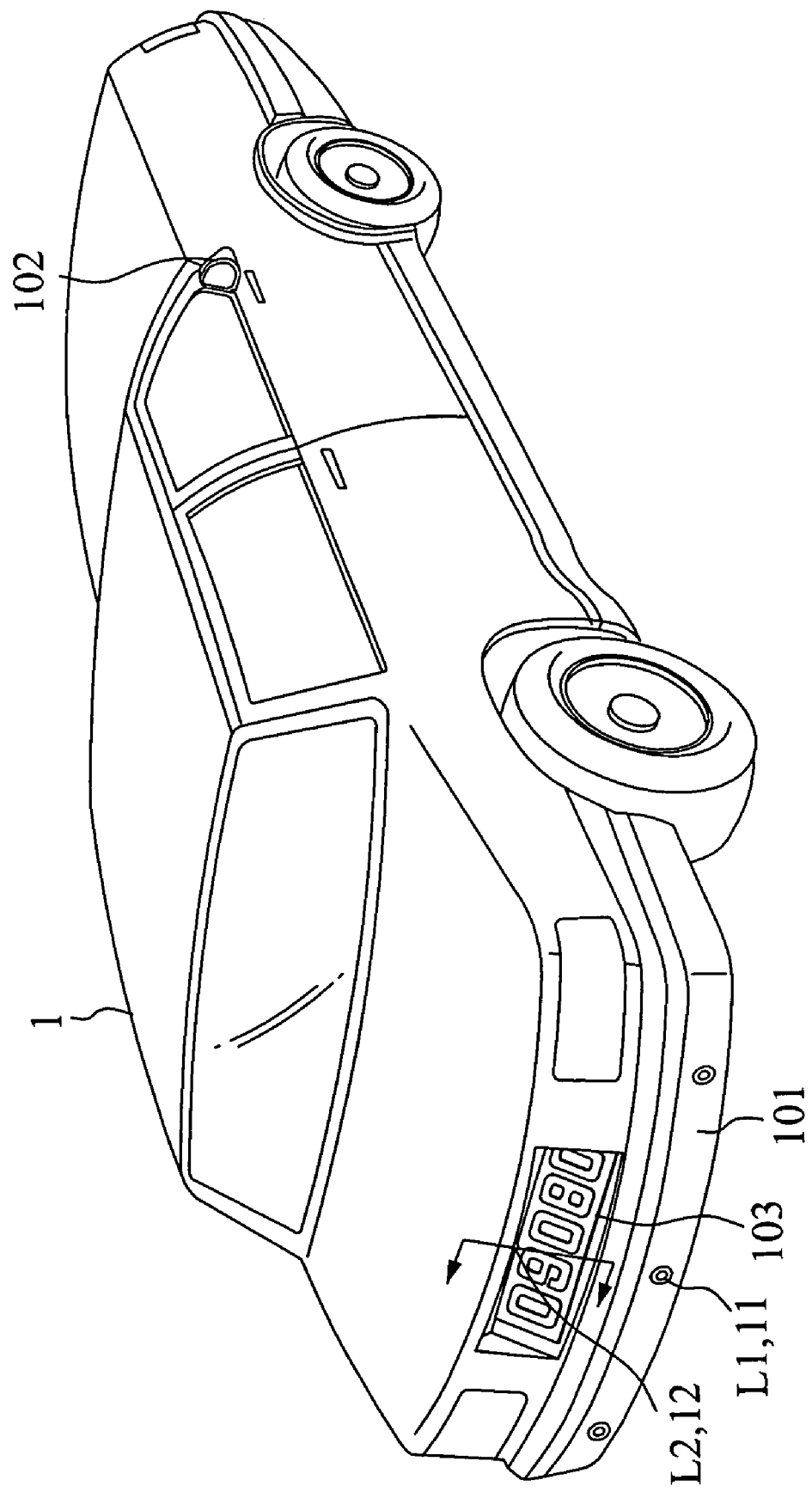
FIG. 2 is a schematic drawing showing an installation example of the vehicle rear side video monitoring system according to the present invention.

Referring to FIGS. 1 and 2, a vehicle rear side video monitoring system is shown installed in the rear side of a car 1, comprising a CMOS (Comprehensive Metal Oxide Semiconductor) image pickup device 11, a high brightness LED (light emitting diode) 12, a display unit 13, and a controller 14. The controller 14 controls the high brightness LED 12 to give off light, the CMOS image pickup device 11 to pick up and process the image S of the scene behind the car 1, and the display unit 13 to display the processed image S.

Because the CMOS image pickup device 11 and the high brightness LED 12 are compact, they can easily be installed in the limited space at the rear side of the car 1. Further, the cost of these two parts is relatively lower to a conventional CCD camera, thereby highly competitive in the market. Further, these two parts are light in weight, not easy to be damaged upon vibration. Comparing to conventional CCD cameras, the invention is more durable in use.

According to this embodiment, the display unit 13 is a LCD (liquid crystal display) 131. Further, the CMOS image pickup device 11 comprises an image pickup lens installed in the rear bumper 101 of the car 1 and adapted to pick up the image S of the scene behind the car 1 for processing by the CMOS image pickup device 11, causing the CMOS image pickup device 11 outputs a corresponding video signal M. The image pickup lens of the CMOS image pickup device 11 is most preferably installed in the rear bumper 101 of the car 1 around the center area L1 to pick up the image S of the scene behind the car 1 clearly, preventing incomplete rear side image due to dead angle around the border area of the rear side of the car 1.

Alternatively, the CMOS image pickup device 11 can be installed in the rearview mirror 102 at the left/right side of the car 1.

Because the invention uses the CMOS image pickup device 11 to pick up images, a relatively higher surrounding illumination is needed so that a high quality of the image S of the scene behind the car 1 can be obtained. Therefore, the invention uses the aforesaid high brightness LED 12 to provide sufficient illumination. According to this embodiment, the high brightness LED 12 is a high brightness white light LED for the advantage of low color difference.

Figure 3:
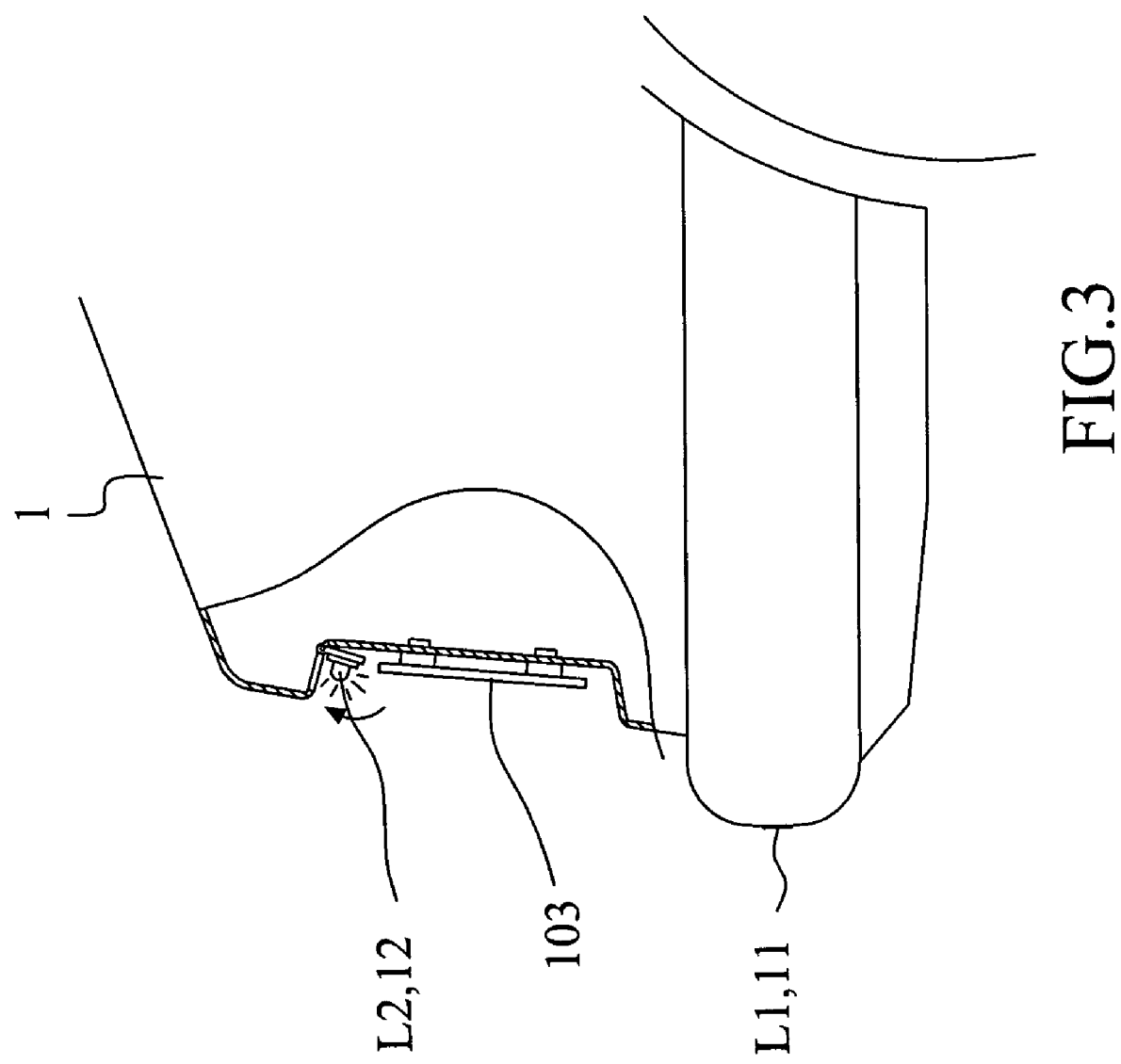
FIG. 3 is a sectional view in an enlarged scale of a part of FIG. 2, showing the positioning of the CMOS image pickup device and the high brightness LED in the rear side of the car.

The high brightness LED 12 is preferably installed in the center area of the rear side of the car 1 adjacent to the rear bumper 101, for example, in the license light housing 12 at the rear side of the car 1 above the license plate 103, as shown in FIG. 3, where the high brightness LED 12 is well protected against weather and can effectively enhance the exposure of the CMOS image pickup device 11 to pick up the image S of the scene behind the car 1. Alternatively, the high brightness LED 12 can be installed in the rear bumper, left/right rearview mirror, below the rear cowling, or any other suitable location at the car 1 where the high brightness LED 12 can be well protected against weather.

The vehicle rear side video monitoring system further comprises a starting device 10 adapted to controls on/off of the high brightness LED 12. The starting device 10 is electrically connected to the controller 14 and adapted to output a starting signal A to the controller 14. Upon receipt of the starting signal A from the starting device 10, the controller 14 immediately turns on the high brightness LED 12. Different starting devices may be used to drive the controller 14 to turn on/off the high brightness LED 12 subject to different conditions. For example, in FIGS. 1 and 4, the starting device 10 is the reverse gear transmition device 15, and the starting signal A is a reverse shift signal A1. When the driver operating the reverse gear transmition device 15 to reverse the moving direction of the car 1, the reverse gear transmition device 15 outputs a reverse shift signal A1 to the controller 14, causing the controller 14 to turn on the high brightness LED 12 and to drive the CMOS image pickup device 11 to pick up the image S of the scene behind the car 1. At this time, the high brightness LED 12 provides sufficient illumination to the CMOS image pickup device 11, enabling the CMOS image pickup device 11 to pick up the image S of the scene behind the car 1 clearly. The image S will then be displayed on the LCD 131 subject to the control of the controller 14.

Figure 4:
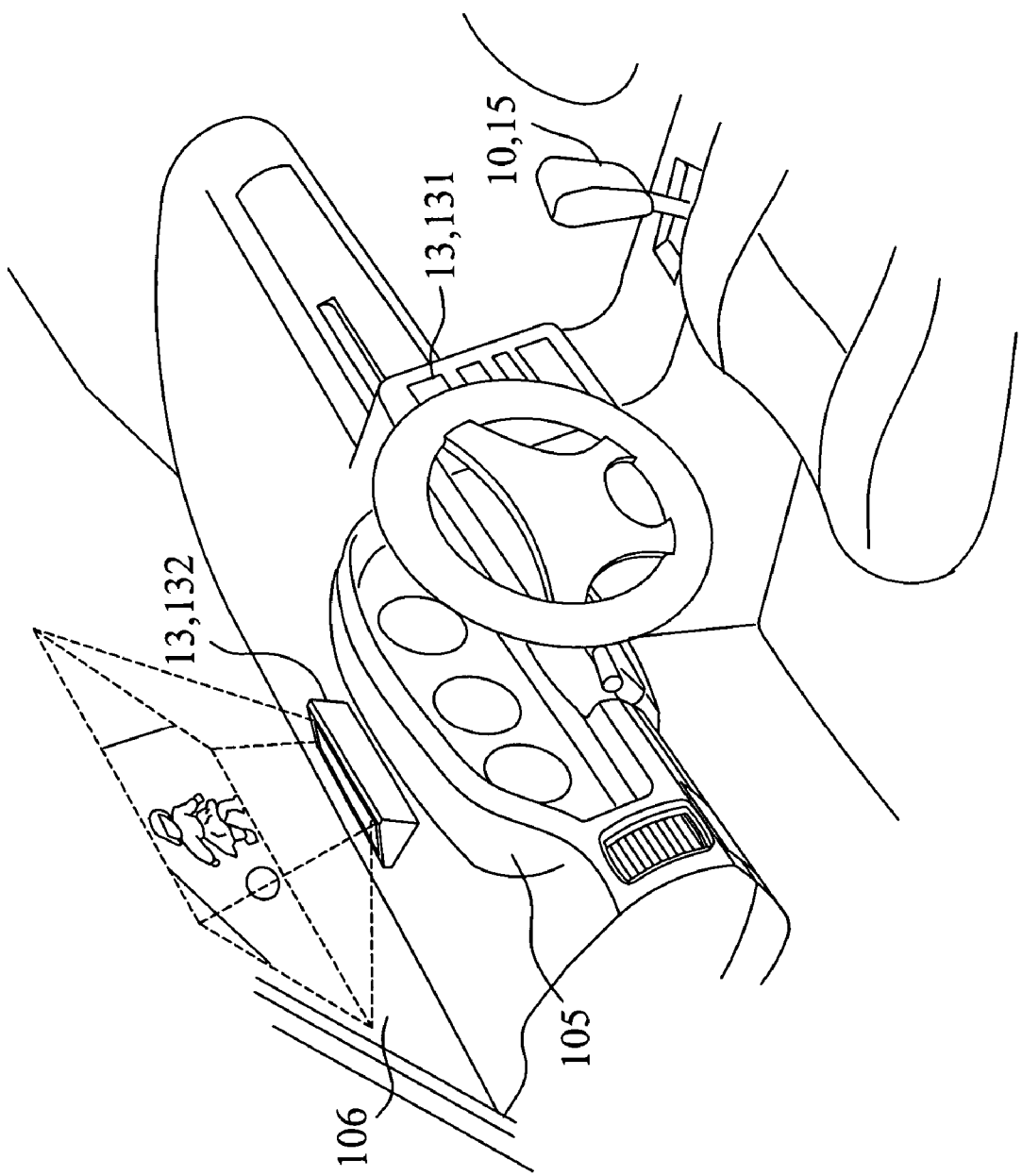
FIG. 4 is a schematic drawing showing a Head-up Display installed in the instrument panel of the car and operated according to the present invention.

Further, as shown in FIG. 4, the image S can be displayed through a Head-up Display 132, which is installed in the instrument panel 105 near the front side and adapted to project images onto the front windshield 106.

Referring to FIG. 1 again, the starting device 10 can be a photo sensor 16 adapted to detect the intensity of the surrounding light. When the intensity of the surrounding light is below a predetermined level (lumen), the photo sensor 16 outputs a low illumination signal A2 to the controller 14, causing the controller 14 to turn on the high brightness LED 12 and to drive the CMOS image pickup device 11 to pick up the image S of the scene behind the car 1.

Referring to FIG. 1 again, the starting device 10 can be an electronic clock 17, which has the alarm function for enabling the user to set the alarm time. When the set time is up, the electronic clock 17 outputs an alarm signal A3. For example, the owner of the car 1 can set the electronic clock 17 to output the alarm signal A3 to the controller 14 at a particular time within the nighttime period from PM6:00 through AM6:00, causing the controller 14 to turn on the high brightness LED 12 and to drive the CMOS image pickup device 11 to pick up the image S of the scene behind the car 1. The aforesaid particular time can be provided by the electronic clock 17 itself, or by an on-vehicle time counting or time signal means, for example, satellite signal containing a satellite time signal from an on-vehicle GPS (Global Positioning System).

Further, the owner of the car can uses a remote controller 182 to send a wireless signal A4 to a wireless receiver 181, causing the wireless receiver 181 to transmit the wireless signal A4 to the starting device 10 and then the controller 14 for controlling the operation of the high brightness LED 12.

Except the aforesaid various different forms of the starting device 10, the starting device 10 can be as simple as a single push button, audio switch, or their combination. One single button or switch is sufficient for controlling the high brightness LED 12 to give off light and the CMOS image pickup device 11 to pick up the image S of the scene behind the car 1.

Although the present invention has been explained in relation to its preferred embodiment, it is to be understood that many other possible modifications and variations can be made without departing from the spirit and scope of the invention as hereinafter claimed.

What is claimed is:

1. A vehicle rear side video monitoring system installed in a motor vehicle, comprising:
    a CMOS (Comprehensive Metal Oxide Semiconductor) image pickup device installed in a specific position of a rear side of said motor vehicle and adapted to pick up and process an image of the scene behind said motor vehicle and to output a corresponding video signal;
    at least one high brightness LED (light emitting diode) installed in an another specific position of the rear side of said motor vehicle near said specific position;
    a display unit mounted inside said motor vehicle;
    a controller electrically connected to said CMOS image pickup device, said at least one high brightness LED, and said display unit, wherein said controller controls said at least one high brightness LED to give off light when controlling said CMOS image pickup device to pick up and process the image of the scene behind said motor vehicle, and controls said display unit to display the image of the scene behind said motor vehicle; and
    a starting device electrically connected to said controller and controllable to output a starting signal to said controller, said controller fetches said starting signal to accordingly drive said at least one high brightness LED to give off light,
    wherein said starting device comprises an electronic clock; said starting signal is an alarm signal produced by said electronic clock.

2. The vehicle rear side video monitoring system as claimed in claim 1, wherein said at least one high brightness LED includes a high brightness white light LED.

3. The vehicle rear side video monitoring system as claimed in claim 1, wherein said starting device is a reverse gear transmition device; said starting signal is a reverse shift signal produced by said reverse gear transmition device when in a reverse gear shift thereof.

4. The vehicle rear side video monitoring system as claimed in claim 1, wherein said starting device comprises a photo sensor; said starting signal is a low illumination signal produced by said photo sensor when in low illuminations.

5. The vehicle rear side video monitoring system as claimed in claim 1, wherein said starting device comprises a wireless receiver, and a remote controller; said starting signal is a wireless signal produced by said remote controller.

6. The vehicle rear side video monitoring system as claimed in claim 1, wherein said CMOS image pickup device is installed in a rear bumper of said motor vehicle.

7. The vehicle rear side video monitoring system as claimed in claim 1, wherein said CMOS image pickup device is installed in one rearview side-mirror of said motor vehicle.

8. The vehicle rear side video monitoring system as claimed in claim 1, wherein said at least one high brightness LED is installed in a license light housing at the rear side of said motor vehicle adjacent to a license plate.

9. The vehicle rear side video monitoring system as claimed in claim 1, wherein said display unit comprises an LCD (liquid crystal display).

10. The vehicle rear side video monitoring system as claimed in claim 9, wherein said display unit comprises a head-up display installed in an instrument panel of said motor vehicle and facing to a front windshield of said motor vehicle.

* * * * *